(12) United States Patent
Lessard et al.

(10) Patent No.: US 6,766,898 B2
(45) Date of Patent: Jul. 27, 2004

(54) SURFACE CONVEYOR WITH VARIABLE DELIVERY RATE FOR BAGGING BAKERY PRODUCTS

(76) Inventors: Claude Lessard, 4252 Varennes, Rock Forest, Quebec (CA), J1N 1Y1; Jean-Louis Bergeron, 1262 Ste-Therese, Sherbrooke, Quebec (CA), J1K 2V4; Camille Menier, 68 rue Lariviere, St-Constant, Quebec (CA), J5A 1M1

( * ) Notice: Subject to any disclaimer, the term of this patent is extended or adjusted under 35 U.S.C. 154(b) by 113 days.

(21) Appl. No.: 09/948,349

(22) Filed: Sep. 7, 2001

(65) Prior Publication Data

US 2003/0047425 A1 Mar. 13, 2003

(51) Int. Cl.[7] .............................................. B65G 23/00
(52) U.S. Cl. ................. 198/792; 198/460.2; 198/459.8; 198/833
(58) Field of Search ............................ 198/792, 460.2, 198/459.8, 833

(56) References Cited

U.S. PATENT DOCUMENTS

| | | | |
|---|---|---|---|
| 2,609,086 A | * | 9/1952 | McBride et al. ............ 198/203 |
| 3,565,238 A | * | 2/1971 | Candela ....................... 198/110 |
| 3,580,383 A | * | 5/1971 | Van Der Wal ................ 198/16 |
| 3,583,543 A | * | 6/1971 | Angioletti .................... 198/16 |
| 3,630,502 A | * | 12/1971 | Schmidt ....................... 263/28 |
| 3,653,489 A | | 4/1972 | Tullis et al. ................. 198/110 |
| 3,661,243 A | * | 5/1972 | Piatek .......................... 198/34 |
| 3,903,806 A | * | 9/1975 | Ayres et al. .................... 104/25 |
| 4,066,161 A | * | 1/1978 | Michalon et al. ........... 198/334 |
| 4,240,537 A | * | 12/1980 | Dunstan ....................... 198/334 |
| 4,284,191 A | * | 8/1981 | Lavau .......................... 198/792 |
| 4,508,205 A | * | 4/1985 | Aulagner et al. ............ 198/334 |
| 4,509,429 A | * | 4/1985 | de Broqueville ............. 104/25 |
| 4,887,809 A | | 12/1989 | Eberle .......................... 271/203 |
| 5,176,240 A | | 1/1993 | Harris ....................... 198/343.1 |
| 5,271,210 A | | 12/1993 | Tolson .......................... 53/550 |
| 5,280,830 A | | 1/1994 | Schiaretti et al. ......... 198/465.3 |
| 5,339,938 A | | 8/1994 | Patin ........................... 198/334 |
| 5,371,995 A | | 12/1994 | Guttinger et al. ............. 53/251 |
| 5,735,384 A | | 4/1998 | Lingo et al. ............. 198/465.1 |
| 5,934,862 A | * | 8/1999 | Brown et al. ................ 414/528 |
| 6,019,214 A | | 2/2000 | Herronen et al. ........ 198/465.1 |
| 6,035,994 A | * | 3/2000 | Blatter ....................... 198/343.1 |
| 6,044,955 A | * | 4/2000 | Stawniak ..................... 198/334 |
| 6,186,732 B1 | * | 2/2001 | Brown et al. ................ 414/528 |
| 6,454,079 B1 | * | 9/2002 | Teramoto ..................... 198/334 |

* cited by examiner

Primary Examiner—James R. Bidwell
Assistant Examiner—Rashmi Sharma
(74) Attorney, Agent, or Firm—Thomas, Kayden, Horstemeyer & Risley

(57) ABSTRACT

A conveyor 20 comprising a continuous conveyor belt 35, driven at a constant speed, and configured for compression and expansion along the direction of travel of the continuous conveyor belt 35. The continuous conveyor belt 35 passes over a drive pulley 32 and a secondary pulley 34 that freely rotates. At least one impulse linkage 37 engages the continuous conveyor belt 35, the impulse linkage 37 extends beyond the continuous conveyor belt 35 such that it may be contacted by an impulse striker 49 that is configured to intermittently contact said impulse linkage 37. By so contacting the impulse linkage 37, a displacement of a portion of the continuous conveyor belt 35 relative to the rest of the continuous conveyor belt 35 is caused due to the subsequent expansion or compression of the continuous conveyor belt 35, resulting in a localized acceleration.

16 Claims, 4 Drawing Sheets

SURFACE CONVEYOR WITH VARIABLE DELIVERY RATE FOR BAGGING BAKERY PRODUCTS

FIELD OF THE INVENTION

The present invention generally relates to a conveyor system, and more particularly to a surface conveyor system with a variable delivery rate along the length of the conveyor.

BACKGROUND OF THE INVENION

Conveyor systems are well known in the prior art, including those where objects are conveyed at varying rates at different portions of the conveyor. This is often desired in that various processes may occur at different points along the conveyor that require more or less time to complete than would be provided by a conveyor operating at a constant rate. For example, it is common to have machines along a common conveyor that conduct their operations at varying rates. As well, in order to maximize efficiency, uniformity of product spacing along these conveyors is often desired.

In order to keep product at various points on the conveyor for required periods of time, prior art systems often have conveyors that operate intermittently (i.e., the conveyor would be indexed from one position to the next, remaining stationary for a period of time at discrete intervals). One problem that arises with an indexing system is that conveyor efficiency is adversely effected because product spacing tends to be non-uniform. For example, product congregates in the vicinity of slower processes, thereby causing a lack of product at other points along the conveyor. As well, these systems tend to be noisy and the components are generally subject to considerable wear.

Therefore, there is a need for improved systems and methods which address these and other shortcomings of the prior art.

SUMMARY OF THE INVENTION

The present invention is generally directed to a conveyor with a continuous conveyor belt, driven at a constant speed and being configured for compression and expansion along the direction of travel of the continuous conveyor belt. The continuous conveyor belt passes over a first and a second pulley, the first pulley being a drive pulley and the second pulley being a secondary pulley that freely rotates. At least one impulse linkage is disposed on the continuous conveyor belt, the impulse linkage has a portion that extends beyond the continuous conveyor belt in a plane perpendicular to the direction of travel of the continuous conveyor belt. Also, an impulse striker is configured to intermittently contact the impulse linkage, thereby causing a displacement of a portion of the continuous conveyor belt relative to the rest of the continuous conveyor belt due to the subsequent expansion or compression of the continuous conveyor belt.

The present conveyor also provides a method for conveying with varying rates of delivery along the conveyor length. The method includes the steps of driving a portion of a continuous conveyor belt at a constant rate, placing a product on the continuous conveyor belt, and accelerating a portion of the continuous conveyor belt in a direction parallel to the direction of travel of the continuous conveyor belt.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

DESCRIPTION OF THE DRAWINGS

The accompanying drawings incorporated in and forming a part of the specification, illustrate several aspects of the present invention, and together with the description serve to explain the principles of the invention. In the drawings.

Figure 1:
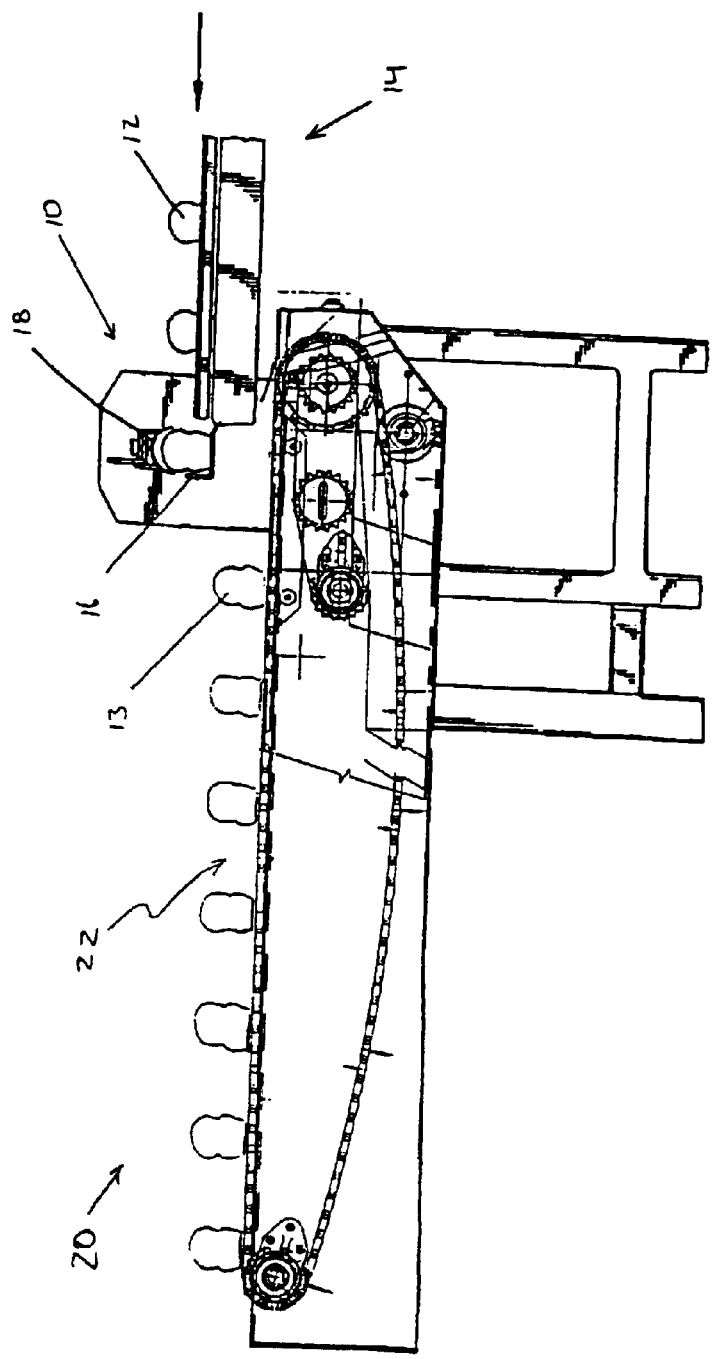
FIG. 1 is a side view of a preferred embodiment of the present invention.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Turning now to the drawings, FIG. 1 illustrates the general arrangement of a conventional bread bagger 10 that deposits bagged loaves 13 of bread onto the upper flight 22 of a surface conveyor 20. An input conveyor 14 delivers freshly baked loaves 12 of bread to the bagger 10 that has lower and upper scoops 16 and 18, respectively, for receiving the loaves 12. A supply of bread bags (not shown) is maintained on the side of conveyor 20, opposite scoops 16 and 18. The loaves 12 are deposited by the input conveyor 14 on the lower scoop 16 of the bagger 10 and the upper scoop 18 and lower scoop 16 straddle the loaf 12 and enter the open end of an inflated bag at the side of the conveyor 20. The scoops 16, 18 move apart to hold the mouth of the bag open. The scoops 16, 18 are then retracted to their starting position on the side of the conveyor 20 opposite the bread bags, during which time they pull the open end of the inflated bag about the loaf 12. The scoops 16, 18 are withdrawn from the bag and the bagged loaf 13 is deposited on a conveyor 20. The conveyor 20, shown as a preferred embodiment of the present invention, then clears the bagged loaf 13 in order to allow further bagging.

Figure 2:
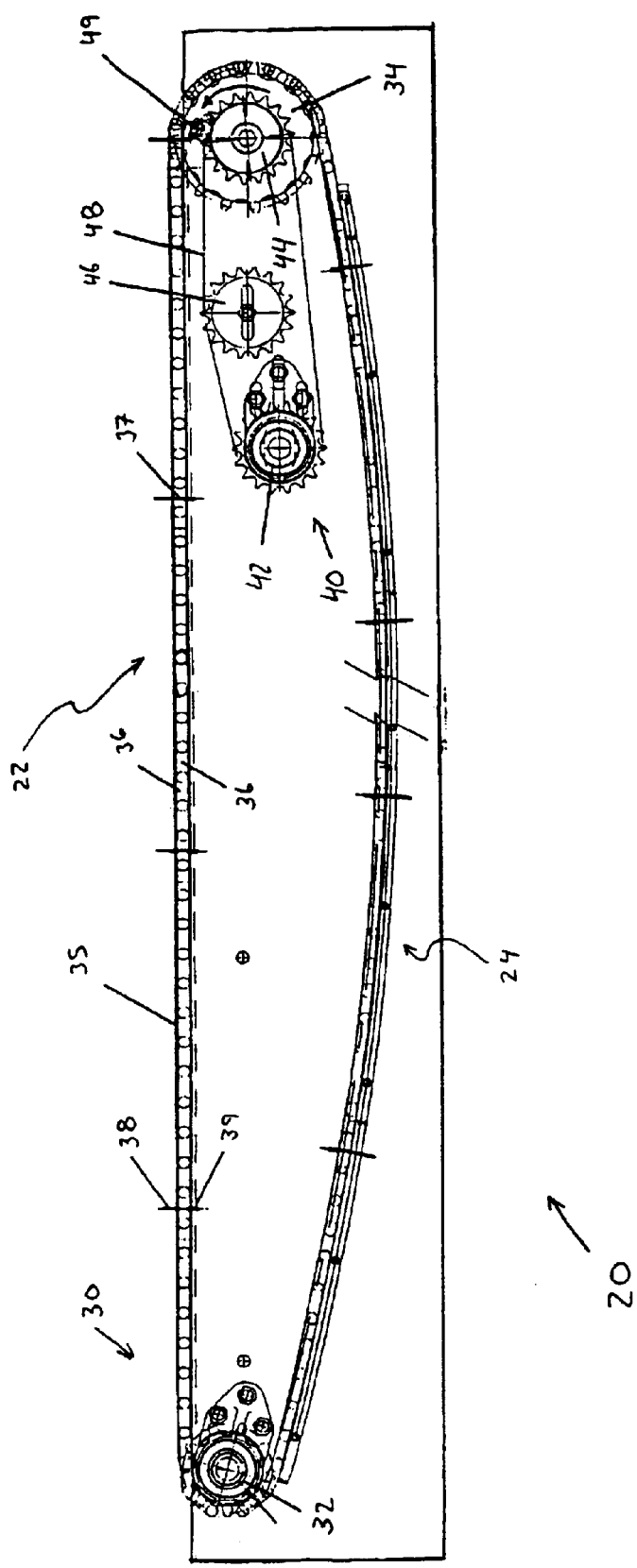
FIG. 2 is a side view of the conveyor of FIG. 1, showing detail of the conveyor.

As shown in FIG. 2, the conveyor 20 includes a primary conveyor 30 having a drive pulley 32 and associated secondary pulley 34. A continuous conveyor belt 35 is wrapped around the drive pulley 32 and secondary pulley 34 of the primary conveyor 30 and includes upper and lower flights 22 and 24, respectively, and the intermittently spaced impulse linkages 37. The impulse conveyor 40 has an impulse drive pulley 42, a secondary impulse pulley 44, a guide pulley 46, and a continuous striker chain 48. The guide pulley 46 is positioned so that the upper flight of the continuous striker chain 48 between the secondary impulse pulley 44 and the guide pulley 46 runs substantially parallel to the upper flight 22 of the continuous conveyor belt 35 of the primary conveyor 30. This provides the impulse striker 49, located on the continuous striker chain 48, the opportunity to engage the impulse linkage 37 at any point along length of the continuous conveyor belt 35 as defined from the lowermost point of the secondary pulley 34 up to the point directly above the centerline of the impulse guide pulley 46. Note, however, that in another embodiment of the present invention, the guide pulley 46 can be omitted so long as the impulse drive pulley 42 is positioned such that the impulse striker 49 can still engage the impulse linkage 37.

In the preferred embodiment represented in FIG. 2, the continuous conveyor belt 35 includes a plurality of interlocking compressible conveyor segments 36 so that the continuous conveyor belt 35 may be compressed to effect a localized acceleration. At set intervals along the continuous conveyor belt 35 are placed impulse linkages 37. In the preferred embodiment shown, the impulse linkages 37 have an upper portion 38 and a lower portion 39 that are attached to an interlocking compressible conveyor segment 36 of the continuous conveyor belt 35 so that the upper portion 38 extends outwardly from the continues conveyor belt 35. The lower portion 39 of the impulse linkage 37 extends inwardly from the continuous conveyor belt 35. This construction allows the upper portion 38 of the impulse linkage 37 to engage the product and help impart an acceleration thereon by preventing slippage of the product along the continuous conveyor belt 35 surface when the lower portion 39 of the impulse linkage 37 is contacted by the impulse striker 49. However, the upper portion 38 may be excluded, as an acceleration may still be imparted on the product by way of the product's direct contact with the interlocking compressible conveyor segments 36 of the primary conveyor 30.

Operation

The conveyor 20 of the present invention includes a primary conveyor 30 with variable delivery rate along the continuous conveyor belt 35 and may be used to move product placed on the surface of the continuous conveyor belt 35 during operations while maintaining uniform product spacing. The operation of the conveyor 20 will now be described.

Figure 3A:
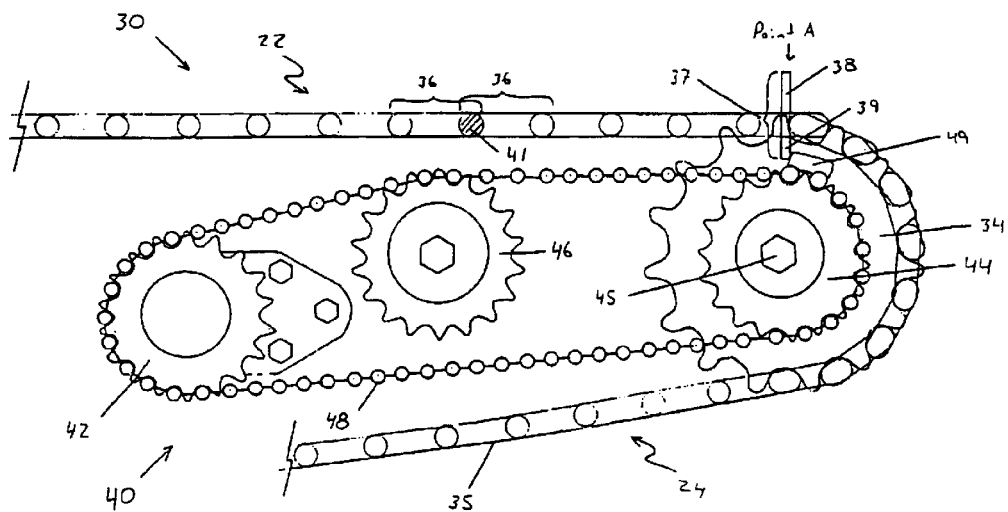
FIGS. 3A and 3B are side views of the conveyor of FIG. 2, including the impulse conveyor and a cutaway portion of the primary conveyor in order to show how the striker of the impulse conveyor engages the impulse linkage of the primary conveyor to cause a localized acceleration in a preferred embodiment.

A drive, such as an electric motor (not shown), rotates drive pulley 32 (FIG. 2) of the primary conveyor 30, at a continuous rate. Teeth on the drive pulley 32 engage the continuous conveyor belt 35 so that the continuous rate of the drive pulley 32 is imparted on the continuous conveyor belt 35. As shown in FIG. 3A, the continuous conveyor belt 35 passes about the secondary pulley 34 of the primary conveyor 30 and returns to the drive pulley 32 so that a continuous loop is formed by the continuous conveyor belt 35 about pulleys 32 and 34. A drive, such as an electric motor (not shown), rotates impulse drive pulley 42, which imparts motion to the continuous striker chain 48. As previously noted, the continuous striker chain 48 passes about the secondary impulse pulley 44 and guide pulley 46, forming a continuous loop. The secondary pulley 34 of the primary conveyor 30 and the secondary impulse pulley 44 rotate about a common shaft 45 that extends transverse to the direction of motion of the continuous conveyor belt 35. However, both the secondary pulley 34 and the secondary impulse pulley 44 are free to rotate independently of the other, i.e. at different rates.

As previously noted (FIG. 1), loaves 12 of bread are transferred to the bagger 10 by an input conveyor 14 and deposited on the lower scoop 16. The loaves 12 are then bagged as is known in the prior art and are lowered onto the conveyor 20 of the present invention. The continuous conveyor belt 35 is driven by drive pulley 32 at a constant rate. In order to keep the bagged loaves 13 uniformly spaced and prevent the bagging operation from causing a slow down in the overall operation of the conveyor 20, it is desirable to transfer the bagged loaves 13 from the bagging area so as to provide space for the oncoming loaves 13. This is accomplished by producing a localized acceleration of a portion of the continuous conveyor belt 35 in the vicinity of the bread bagger 10.

Figure 3B:
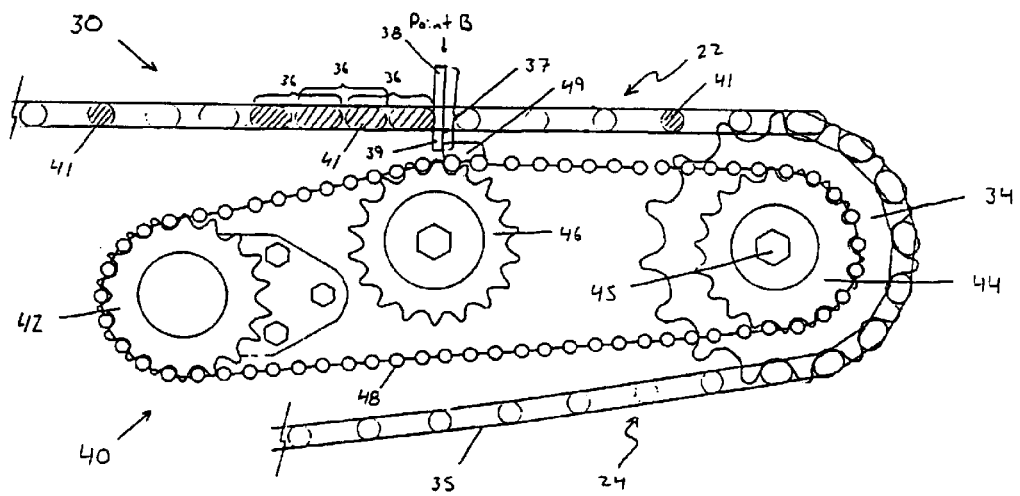

FIGS. 3A and 3B show how the present invention creates a localized acceleration of the continuous conveyor belt 35. In order to create the localized acceleration on the continuous conveyor belt 35, the impulse conveyor 40 is operated at a faster rate than that of the primary conveyor 30. The rate chosen for the impulse conveyor 40 is dependent upon a number of factors, such as desired product spacing, the period of time it takes to perform a given process, spacing of the impulse linkages 37, and the rate at which the continuous conveyor belt 35 is driven. The secondary impulse pulley 44 is configured such that the impulse striker 49 contacts the lower portion 39 of the impulse linkage 37 as the impulse striker 49 rotates about the secondary impulse pulley 44. In so doing, the impulse striker 49 exerts force on the lower portion 39 of the impulse linkage 37. As shown, the impulse striker 49 makes contact with the impulse linkage 37 at a point (Point A) directly above the centerline of both the secondary pulley 34 and secondary impulse pulley 44, which is the beginning of the upper flight 22 of the continuous conveyor belt 35 of the primary conveyor 30. Note that at the moment the impulse striker 49 contacts the impulse linkage 37, the smallest possible overlap regions 41 exist between adjacent interlocking compressible conveyor segments 36. This is because the continuous conveyor belt 35 is being pulled by the drive pulley 32 (FIG. 2) of the primary conveyor 30, thereby causing maximum extension of the interlocking compressible conveyor segments 36. Also note Point A was chosen for convenience of description and that the initial point of contact between the impulse striker 49 and the impulse linkage 37 may vary.

In that the impulse conveyor 40 is operating at a faster rate than that of the primary conveyor 30, the impulse striker 49 maintains contact with the impulse linkage 37 until the impulse striker 49 reaches Point B, as shown in FIG. 3B. Point B lies on the centerline of the guide pulley 46. The result of the engagement of the impulse striker 49 with the impulse linkage 37 between Points A and B is a localized acceleration of the continuous conveyor belt 35. As the impulse striker 49 travels from Point A to Point B, the impulse striker 49 urges the impulse linkage 37 and the interlocking compressible conveyor segment 36 to which the impulse linkage 37 is attached at the faster rate of the impulse conveyor 40. By so urging the impulse linkage 37, the impulse conveyor 40 causes relative motion between the interlocking compressible conveyor segments 36 forward of the impulse linkage 37 relative to the direction of motion. The resultant relative motion of the interlocking compressible conveyor segments 36 results in greater overlap regions 41 between the interlocking compressible conveyor segments 36 closest to the front of the impulse linkage 37. Note that the overlap regions 41 between adjacent interlocking compressible conveyor segments 36 become smaller as one moves farther away from the impulse linkage 37. Overlap between adjacent interlocking compressible conveyor segments 36 results in an overall compression of the continuous conveyor belt 35, and hence, a localized acceleration. In turn, a product in contact with this portion of the continuous conveyor belt 35 will undergo an acceleration as well. The upper portion 38 of the impulse linkage 37 is not a required element of the present invention, however, in the preferred embodiment, the upper portion 38 helps align the slices of the loaves 12 (FIG. 1), serves to prevent product slippage and helps ensure that the localized acceleration is imparted on the product. By exerting either a greater or lesser force on the impulse linkage 37 via the impulse striker 49, due to the speed difference therebetween, a greater or lesser compression of interlocking compressible conveyor segments 36 will take place. Hence, a greater or lesser localized acceleration is imparted on the continuous conveyor belt 35.

Note that although the primary conveyor 30 is driven at a continuous rate during steady state operation, it is possible to vary the rate at which the primary conveyor 30 is driven without affecting the performance of the conveyor 20 (FIG. 2). A new continuous rate for steady state operation can be achieved so long as the ratio of the speeds at which the drive pulley 32 (FIG. 2) and the impulse drive pulley 42 are driven remains constant.

Figure 4A:
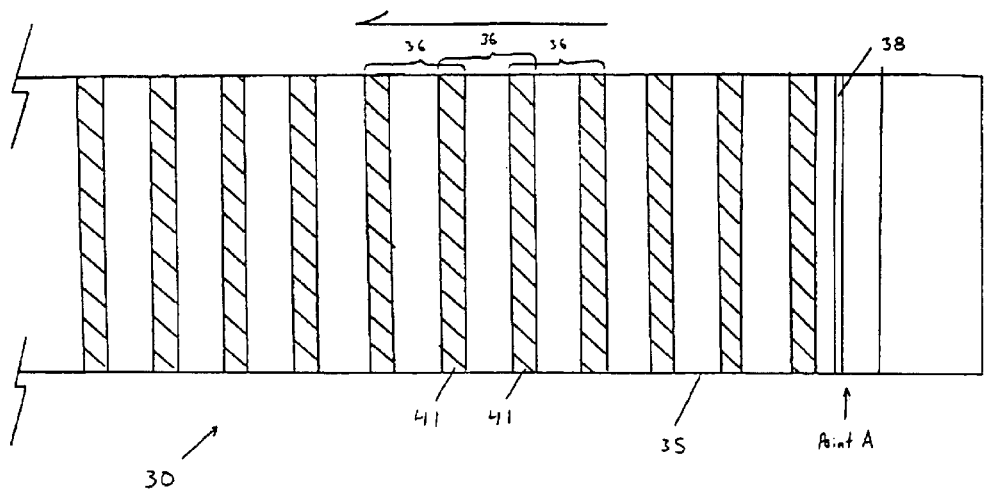
FIGS. 4A and 4B are top schematic representations of the continuous conveyor belt sections of FIGS. 3A and 3B.
Figure 4B:
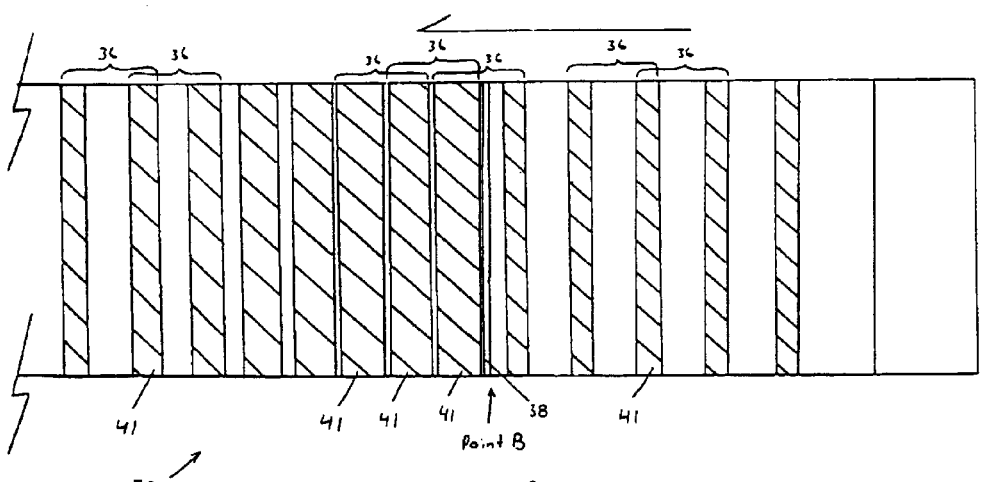

FIG. 4A is a top view schematic of FIG. 3A, when the impulse striker 49 has made initial contact with the impulse linkage 37 at Point A. Note that all of the overlap regions 41 are of equal size, and their smallest possible values. This is because, as previously discussed, no force has been exerted on the impulse linkage 37 by the impulse striker 49 as of yet. Rather, the continuous conveyor belt 35 is being pulled in the direction indicated by the drive pulley 32 (FIG. 2) of the primary conveyor 30. Therefore, the continuous conveyor belt 35 is under tension and adjacent interlocking compressible conveyor segments 36 are extended to their maximum extent. FIG. 4B is a top view schematic of FIG. 3B, showing the effect of the force exerted by the impulse striker 49 on the impulse linkage 37 between Points A and B. The overlap regions 41 forward of the impulse linkage 37 are greatest closest to the impulse linkage 37, and gradually get smaller as one moves away from the impulse linkage 37 and the force imparted by the impulse striker 49 on the impulse linkage 37 is dissipated. Again note that the overlap regions 41 aft of the impulse linkage 37 are uniform and the smallest possible size due to that segment of the continuous conveyor belt 35 being under tension. Note that the distance between Points A and B is selected by determining the position at which the guide pulley 46 (FIGS. 3A and 3B) is located.

It should be emphasized that the above-described embodiments of the present invention, particularly, any preferred embodiments, are merely possible examples of implementations, merely set forth for a clear understanding of the principles of the invention. Many variations and modifications may be made to the above-described embodiment(s) of the invention without departing substantially from the spirit and principles of the invention. For example, alternate embodiments of the present invention could include a device such as a pneumatic striker rather than the impulse conveyor 40 to impart a localized acceleration on the primary conveyor 30. All such modifications and variations are intended to be included herein within the scope of this disclosure and the present invention and protected by the following claims.

What is claimed is:

1. A system for bagging bread comprising:
a continuous conveyor belt, said continuous conveyor belt including a plurality of interlocking compressible conveyor segments, each of said interlocking compressible conveyor segments being configured to slidably engage adjacent interlocking compressible conveyor segments for compression and expansion along an axis that is parallel to a direction of travel of said continuous conveyor belt, driven at constant speed;
a first and a second pulley, said first pulley being a drive pulley and said second pulley being a secondary pulley, said continuous conveyor belt passing over said drive pulley and said secondary pulley;
an impulse linkage engaging said continuous conveyor belt, said impulse linkage having a portion that extends beyond said continuous conveyor belt in a plane perpendicular to the direction of travel of said continuous conveyor belt;
an impulse striker assembly, configured to intermittently contact said impulse linkage, thereby causing a faster displacement of a given point along said continuous conveyor belt relative to another point along said continuous conveyor belt;
an impulse drive assembly further comprising an impulse drive pulley, an impulse secondary pulley, a guide pulley, and a continuous driving mechanism passing over said impulse drive pulley, said guide pulley, and said impulse secondary pulley, wherein said guide pulley is disposed between said impulse drive pulley such that a length of said continuous driving mechanism passing between said impulse secondary pulley and said guide pulley lies in a plane that is parallel to the plane containing the upper length of said continuous conveyor belt, and said impulse striker is disposed on said continuous driving mechanism.

2. A conveyor comprising:
a continuous conveyor belt including a plurality of interlocking compressible conveyor segments, each of said interlocking compressible conveyor segments being configured to slidably engage adjacent interlocking compressible conveyor segments, said continuous conveyor belt configured for compression and expansion along an axis that is parallel to a direction of travel of said continuous conveyor belt;
a first and a second pulley, said first pulley being a drive pulley and said second pulley being a secondary pulley, said continuous conveyor belt passing over said drive pulley and said secondary pulley;
an impulse linkage engaging said continuous conveyor belt; and
an impulse striker assembly, configured to intermittently contact said impulse linkage, thereby causing a faster displacement of a given point along said continuous conveyor belt relative to another point along said continuous conveyor belt.

3. The conveyor of claim 2, wherein said continuous conveyor belt is driven at constant speed.

4. The conveyor of claim 2, further comprising an impulse drive assembly having an impulse drive pulley, an impulse secondary pulley, and a continuous driving mechanism passing over said impulse drive pulley and said impulse secondary pulley, wherein said impulse striker is disposed on said continuous driving mechanism.

5. The conveyor of claim 4, wherein a length of said continuous driving mechanism passing between said impulse drive pulley and impulse secondary pulley lies in a horizontal plane that is parallel to the plane in which the upper length of said continuous conveyor belt lies.

6. The conveyor of claim 2, wherein said impulse drive assembly further comprises an impulse drive pulley, an impulse secondary pulley, a guide pulley, and a continuous driving mechanism passing over said impulse drive pulley, said guide pulley, and said impulse secondary pulley, wherein said guide pulley is disposed between said impulse drive pulley and said impulse secondary pulley, and said impulse striker is disposed on said continuous driving mechanism.

7. The conveyor of claim 6, wherein a length of said continuous driving mechanism passing between said impulse secondary pulley and said guide pulley lies in a plane that is substantially parallel to the plane containing the upper length of said continuous conveyor belt.

8. The conveyor of claim 2, said impulse linkage having a portion that extends beyond said continuous conveyor belt in a plane perpendicular to the direction of travel of said continuous conveyor belt.

9. The conveyor of claim 2, wherein said impulse linkage further comprises an upper portion and a lower portion, said upper and lower portions engaging said continuous conveyor belt such that said upper and said lower portions are opposed and are perpendicular to said continuous conveyor belt.

10. The conveyor of claim 2, wherein said impulse drive assembly is operated at a rate of speed such that said impulse striker imparts a force on said impulse linkage in a direction of travel of said impulse linkage, thereby causing a localized compression of said continuous conveyor belt forward of said impulse linkage relative to the direction of travel of said impulse linkage while causing a localized extension of said continuous conveyor belt aft of said impulse linkage relative to the direction of travel of said impulse linkage.

11. A conveyor comprising:
a continuous conveyor belt including a plurality of interlocking compressible conveyor segments, each of said interlocking compressible conveyor segments being configured to slidably engage adjacent interlocking compressible conveyor segments, said continuous conveyor belt configured for compression and expansion along an axis that is parallel to a direction of travel of said continuous conveyor belt;

a first and second pulley, said first pulley being a drive pulley and said second pulley being a secondary pulley, said continuous conveyor belt passing over said drive pulley and said secondary pulley;

an impulse linkage engaging said continuous conveyor belt; and a means for engaging said impulse linkage such that a given point along said continuous conveyor belt is displaced relative to another point along said continuous conveyor belt.

12. A conveyor comprising:
a continuous conveyor belt, said continuous conveyor belt configured for compression and expansion along an axis that is parallel to a direction of travel of said continuous conveyor belt;

a first and a second pulley, said first pulley being a drive pulley and said second pulley being a secondary pulley, said continuous conveyor belt passing over said drive pulley and said secondary pulley;

an impulse linkage engaging said continuous conveyor belt;

an impulse striker assembly, configured to intermittently contact said impulse linkage, thereby causing a faster displacement of a given point along said continuous conveyor belt relative to another point along said continuous conveyor belt; and an impulse drive assembly having an impulse drive pulley, an impulse secondary pulley, and a continuous driving mechanism passing over said impulse drive pulley and said impulse secondary pulley, wherein said impulse striker is disposed on said continuous driving mechanism.

13. The conveyor of claim 12, wherein said continuous conveyor belt is driven at constant speed.

14. The conveyor of claim 12, said impulse linkage having a portion that extends beyond said continuous conveyor belt in a plane perpendicular to the direction of travel of said continuous conveyor belt.

15. A conveyor comprising:
a continuous conveyor belt, said continuous conveyor belt configured for compression and expansion along an axis that is parallel to a direction of travel of said continuous conveyor belt;

a first and a second pulley, said first pulley being a drive pulley and said second pulley being a secondary pulley, said continuous conveyor belt passing over said drive pulley and said secondary pulley;

an impulse linkage engaging said continuous conveyor belt;

an impulse striker assembly, configured to intermittently contact said impulse linkage, thereby causing a faster displacement of a given point along said continuous conveyor belt relative to another point along said continuous conveyor belt;

an impulse drive assembly including an impulse drive pulley, an impulse secondary pulley, and a continuous driving mechanism passing over said impulse drive pulley and said impulse secondary pulley, said impulse striker being disposed on said impulse striker being disposed on said continuous driving mechanism, and;

wherein said impulse drive assembly is operated at a rate of speed such that said impulse striker imparts a force on said impulse linkage in a direction of travel of said impulse linkage, thereby causing a localized compression of said continuous conveyor belt forward of said impulse linkage relative to the direction of travel of said impulse linkage while causing a localized extension of said continuous conveyor belt aft of said impulse linkage relative to the direction of travel of said impulse linkage.

16. The conveyor of claim 15, wherein said continuous conveyor belt is driven at constant speed.

* * * * *